United States Patent
Yamamoto et al.

(10) Patent No.: US 9,880,622 B2
(45) Date of Patent: Jan. 30, 2018

(54) TACTILE SENSATION PROVIDING APPARATUS AND CONTROL METHOD FOR TACTILE SENSATION PROVIDING APPARATUS WHEN USING AN APPLICATION THAT DOES NOT SUPPORT OPERATION OF TACTILE SENSATION

(75) Inventors: Kazuhiro Yamamoto, Yokohama (JP); Hiroyuki Matsumoto, Setagaya (JP)

(73) Assignee: KYOCERA Corporation, Kyoto (JP)

( * ) Notice: Subject to any disclaimer, the term of this patent is extended or adjusted under 35 U.S.C. 154(b) by 173 days.

(21) Appl. No.: 13/517,918

(22) PCT Filed: Dec. 17, 2010

(86) PCT No.: PCT/JP2010/007344
§ 371 (c)(1),
(2), (4) Date: Jun. 20, 2012

(87) PCT Pub. No.: WO2011/077687
PCT Pub. Date: Jun. 30, 2011

(65) Prior Publication Data
US 2012/0262404 A1 Oct. 18, 2012

(30) Foreign Application Priority Data

Dec. 21, 2009 (JP) .................................. 2009-289359

(51) Int. Cl.
*G06F 3/01* (2006.01)
(52) U.S. Cl.
CPC ................... *G06F 3/016* (2013.01)
(58) Field of Classification Search
CPC ........ G06F 3/016; G06F 3/0414; G06F 3/044; G06F 3/045; G06F 2203/013; G06F 2203/014

(Continued)

(56) References Cited

U.S. PATENT DOCUMENTS

| | | |
|---|---|---|
| 7,205,978 B2 | 4/2007 | Poupyrev et al. |
| 7,579,758 B2 | 8/2009 | Maruyama et al. |

(Continued)

FOREIGN PATENT DOCUMENTS

| | | |
|---|---|---|
| CN | 101828161 A | 9/2010 |
| JP | 11-212725 A | 8/1999 |

(Continued)

OTHER PUBLICATIONS

An Office Action 'Notification of Reason for Refusal' issued by the Japanese Patent Office dated Jun. 18, 2013, which corresponds to Japanese Patent Application No. 2011-547289 and is related to U.S. Appl. No. 13/517,918; with translation.

(Continued)

*Primary Examiner* — Gene W Lee
(74) *Attorney, Agent, or Firm* — Studebaker & Brackett PC (57) ABSTRACT

A tactile sensation providing apparatus for providing a tactile sensation based on an operator's input to an object, without wasting an existing application resource constituting a user interface, and a control method for the tactile sensation providing apparatus are provided.
A tactile sensation providing apparatus 1 includes a touch sensor 40, a tactile sensation providing unit 50 configured to vibrate a touch face of the touch sensor 40, a display unit 30, and a control unit 10 configured to set a tactile sensation to be provided by the tactile sensation providing unit 50 for an object displayed on the display unit 30 based on information about the tactile sensation supplied from application software and, when detecting an input to the object, to control the tactile sensation providing unit 50 such that the tactile sensation set for the object is provided to a pressing object pressing the touch face.

2 Claims, 8 Drawing Sheets

(58) Field of Classification Search
USPC .................. 345/173–183; 178/18.01–18.11, 178/19.01–19.07, 20.01–20.04
See application file for complete search history.

(56) References Cited

U.S. PATENT DOCUMENTS

| | | | |
|---|---|---|---|
| 2003/0040361 A1* | 2/2003 | Thorner | A63F 13/02 463/36 |
| 2005/0052428 A1 | 3/2005 | Hayashi et al. | |
| 2007/0257895 A1 | 11/2007 | Tolaio | |
| 2008/0122315 A1 | 5/2008 | Maruyama et al. | |
| 2008/0132313 A1* | 6/2008 | Rasmussen | G07F 17/32 463/16 |
| 2008/0150905 A1 | 6/2008 | Grivna et al. | |
| 2008/0280678 A1* | 11/2008 | Thorner | A63F 13/02 463/30 |
| 2009/0051667 A1* | 2/2009 | Park et al. | 345/173 |
| 2009/0102805 A1 | 4/2009 | Meijer et al. | |
| 2010/0310136 A1* | 12/2010 | Tsuda | G06F 1/1626 382/124 |
| 2010/0328053 A1 | 12/2010 | Yeh et al. | |
| 2010/0328229 A1* | 12/2010 | Weber et al. | 345/173 |
| 2011/0141052 A1* | 6/2011 | Bernstein et al. | 345/174 |
| 2012/0188180 A1* | 7/2012 | Yang | G06F 3/0488 345/173 |

FOREIGN PATENT DOCUMENTS

| | | |
|---|---|---|
| JP | 2003-288158 A | 10/2003 |
| JP | 2005-031918 A | 2/2005 |
| JP | 2007-212975 A | 8/2007 |
| JP | 2008-123453 A | 5/2008 |
| JP | 2008-130055 A | 6/2008 |
| JP | 2011-008749 A | 1/2011 |
| TW | 200821900 A | 5/2008 |
| TW | 201108063 A | 3/2011 |

OTHER PUBLICATIONS

International Search Report; PCT/JP2010/007344; dated Feb. 8, 2011.

An Office Action issued by the Taiwanese Patent Office dated Nov. 13, 2013, which corresponds to Taiwanese Patent Application No. 100109150 and is related to U.S. Appl. No. 13/517,918; with English language concise explanation.

An Office Action; "Decision of Rejection," issued by the Japanese Patent Office dated Feb. 25, 2014, which corresponds to Japanese Patent Application No. 2011-547289 and is related to U.S. Appl. No. 13/517,918; with English language concise explanation.

An Office Action; "Trial Decision," issued by the Japanese Patent Office dated Jun. 23, 2015, which corresponds to Japanese Patent Application No. 2011-547289 and is related to U.S. Appl. No. 13/517,918; with English language concise explanation.

* cited by examiner

TACTILE SENSATION PROVIDING APPARATUS AND CONTROL METHOD FOR TACTILE SENSATION PROVIDING APPARATUS WHEN USING AN APPLICATION THAT DOES NOT SUPPORT OPERATION OF TACTILE SENSATION

CROSS REFERENCE TO RELATED APPLICATION

This application claims priority to and the benefit of Japanese Patent Application No. 2009-289359 filed on Dec. 21, 2009, the entire contents of which are incorporated herein by reference.

TECHNICAL FIELD

The present invention relates to an apparatus for providing a tactile sensation based on a pressing operation to a touch sensor and a control method for the apparatus.

BACKGROUND ART

In recent years, there are mobile terminals such as mobile phones that employ an input apparatus having a touch sensor such as a touch panel, a touch switch and the like, as an input apparatus such as an operation unit, a switch and the like for detecting a contact operation by a user. Such an input apparatus having the touch sensor is popularly used for not only the mobile terminals but also information equipment such as calculators and ticket vending machines, home electric appliances such as microwaves, TV sets and lighting equipment, industrial equipment (FA equipment) and the like.

There are known a variety of types of those touch sensors, such as a resistive film type, a capacitive type, an optical type and the like. However, touch sensors of these types receive a contact operation by a finger or a stylus pen and, unlike push-button switches, the touch sensors themselves are not physically displaced when touched.

In contact operation to the touch sensor, therefore, the operator is not able to obtain feedback to the contact operation. Without an operation feeling in contact operation, the operator has no means of knowing whether the contact operation is appropriately detected by the terminal. When using such a terminal, accordingly, the operator is likely to repeat the contact operation at the same position, which may cause stress on the operator.

In order to prevent such unnecessary repeated contact operations, there is known an apparatus which, for example, generates sound when the terminal appropriately recognizes the contact operation. There is also known an apparatus which changes a display state by, for example, changing color of a user interface input object (hereinafter, referred to simply as an "object") such as an input button graphically depicted in a display unit at a position corresponding to a position where the contact operation is detected. These apparatuses allow the operator auditory or visual confirmation on whether the contact operation is appropriately detected by the terminal.

However, such auditory feedback may be difficult to be confirmed in a noisy environment and is not applicable when the apparatus being used is in a silent mode. Moreover, in using such visual feedback, if the object displayed on the display unit is small, the operator may not be able to confirm the change in the display state, as a view of the object is blocked by the finger, particularly when the operator performs the contact operation with the finger.

As such, there is suggested a feedback method relying on neither auditory-nor visual sensation but instead vibrating the touch sensor when the touch sensor detects a contact (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

The apparatuses disclosed in the above Patent Documents 1 and 2 are able to provide the tactile sensation at an operator's fingertip by vibration when the contact to the touch sensor is detected. Therefore, in using such an apparatus, the operator may recognize, through the tactile sensation, that the contact operation to the touch sensor is appropriately detected by the apparatus.

In order to provide the tactile sensation when the contact is detected, however, such a tactile sensation providing apparatus needs an operation to provide the tactile sensation under a predetermined condition to be preliminarily incorporated into application software (hereinafter, referred to simply as "application"). That is, the above apparatuses may provide the tactile sensation based on the predetermined condition by using an application developed to generate vibration. However, when using an application that does not support generation of vibration as it stands, the above apparatus may not appropriately provide the tactile sensation.

Accordingly, in order to appropriately provide the tactile sensation based on the predetermined condition by the apparatus described above, it is necessary to develop a new application or modify an existing application by adding an operation to provide the tactile sensation or the like thereto.

For example, it is necessary to add to the application the operation to provide a predetermined tactile sensation upon detection of a contact to the touch sensor at a position corresponding to the object such as a key or a button graphically depicted in the display unit of the tactile sensation providing apparatus. It is also necessary to set such that the tactile sensation providing apparatus does not provide the tactile sensation when detecting a contact to the touch sensor elsewhere than the position of the object such as the key or the button graphically depicted in the display unit.

By controlling provision of the tactile sensation as described above, the tactile sensation providing apparatus, when detecting the contact via the user interface employing the touch sensor and GUI (Graphical User Interface), may provide the tactile sensation by vibration at the operator's fingertip and the like. That is, the tactile sensation providing apparatus, by providing the tactile sensation, may notify the operator of that the contact by the operator to the object such as the key or the button graphically depicted is detected. Also, the tactile sensation providing apparatus may avoid providing feedback when the contact is detected elsewhere than the position of the object such as the key or the button graphically depicted.

In controlling as described above, the tactile sensation providing apparatus generally needs to corporate with an application which manages a state of the GUI when there is the contact to the touch sensor, that is, a state of the object such as the key or the button displayed on the display unit.

The following is a description of an assumed operation of the tactile sensation providing apparatus for providing the tactile sensation.

Figure 7:
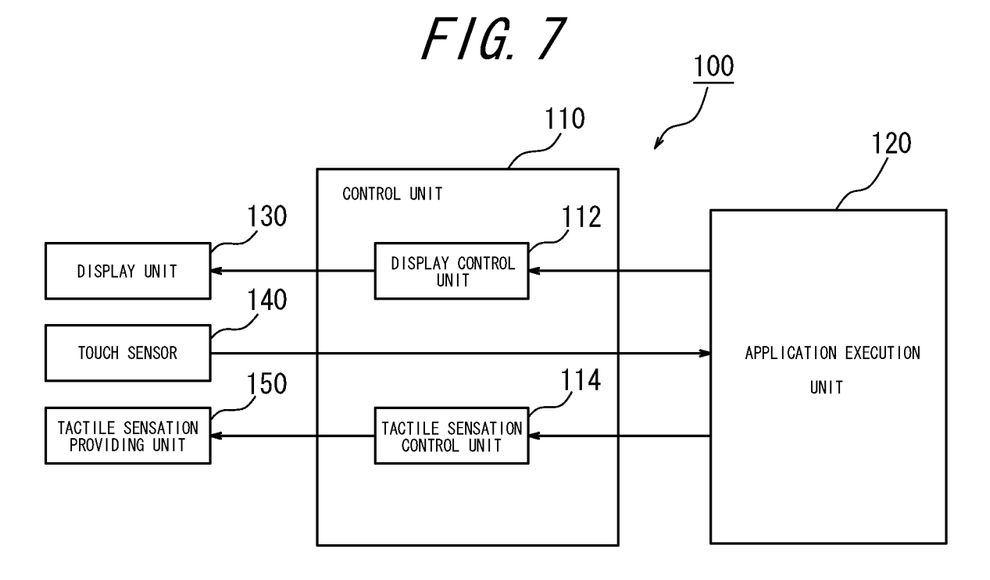
FIG. 7 is a block diagram illustrating a schematic configuration of an assumed tactile sensation providing apparatus.

FIG. 7 is a block diagram illustrating a schematic configuration of an assumed tactile sensation providing apparatus. As illustrated in FIG. 7, a tactile sensation providing apparatus 100 includes a control unit 110, an application execution unit 120, a display unit 130, a touch sensor 140 and a tactile sensation providing unit 150. The control unit 110 includes a display control unit 112 and a tactile sensation control unit 114.

The control unit 110 controls the overall tactile sensation providing apparatus 100 including each function unit. The application execution unit 120 retrieves a variety of applications from a memory unit (not illustrated) and executes operations based on the applications. In the following description, it is assumed that the operation to provide the predetermined tactile sensation when the touch sensor 140 detects the contact at a position corresponding to the object displayed on the display unit 130 is preliminarily added to (incorporated in) the application executed by the application execution unit 120.

The display unit 130 is constituted by using a liquid crystal display, an organic EL display or the like and displays the object of the key or the button graphically depicted for suggesting the operator to contact. The touch sensor 140 is usually disposed on a front face of the display unit 130 to detect the contact operation by the operator's finger or the like on the touch face of the touch sensor 140 corresponding to a position of the object displayed on the display unit 130. Also, the touch sensor 140 notifies the application execution unit 120 via the control unit 110 of the contact position detected on the touch face. The tactile sensation providing unit 150 is constituted by using a small eccentric motor, a piezoelectric element or the like and, by vibrating the touch face of the touch sensor 140, provides the tactile sensation to a contact object such as the operator's finger or the like performing the contact operation.

The display control unit 112 of the control unit 110, based on display data supplied from the application execution unit 120, controls a display to display images of the object and the like on the display unit 130 and also to change the display state of the image. The tactile sensation control unit 114, based on an instruction of the application execution unit 120, controls the tactile sensation providing unit 150 to provide vibration in a vibration pattern based on the predetermined condition.

Figure 8:
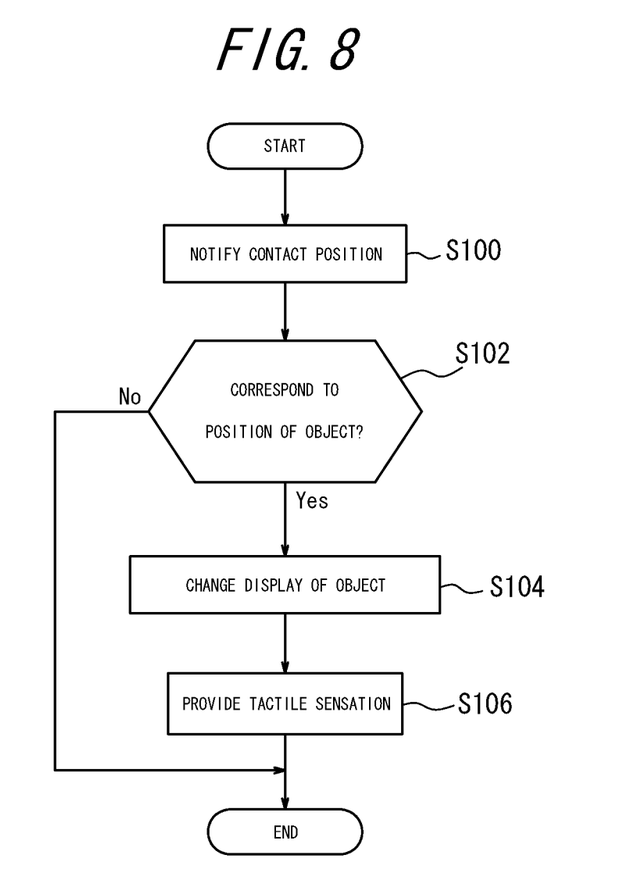
FIG. 8 is a flowchart illustrating an operation of the assumed tactile sensation providing apparatus.

FIG. 8 is a flowchart for schematically illustrating an example of the operation to provide the tactile sensation based on detection of the contact by the tactile sensation providing apparatus 100.

At a point when the contact to the touch face of the touch sensor 140 is detected, the tactile sensation providing apparatus 100 starts an operation to control provision of the tactile sensation. When this operation is started, first, the touch sensor 140 notifies the application execution unit 120 of the contact position on the touch face (step S100). When notified of the contact position, the application execution unit 120 determines whether the contact position corresponds to the image of the object such as the key or the button on the display unit 130 (step S102). At step S102, when the contact position does not correspond to the image of the object such as the key or the button on the display unit 130, the application execution unit 120 ends the operation without issuing an instruction related to the display or the tactile sensation. In this case, the tactile sensation is not provided.

On the other hand, when the contact position corresponds to the image of the object such as the key or the button on the display unit 130, the application execution unit 120 supplies the display control unit 112 with the display data for displaying a notification that the input is detected. Here, the notification that the input is detected is a display allowing a visual confirmation of the operator by, for example, momentarily highlighting the object such as the key or the button or displaying depression of the key or the button. Upon receiving the display data from the application execution unit 120, the display control unit 112 changes the image on the display unit 130 based on the display data (step S104).

Subsequently, in order to notify the operator of that the input is detected, the application execution unit 120 instructs the tactile sensation control unit 114 to provide the predetermined tactile sensation. Here, the predetermined tactile sensation is provided by, for example, momentarily vibrating the touch face of the touch sensor such that the operator may perceive feedback by the sense of touch. Upon receiving the instruction to provide the tactile sensation as described above, the tactile sensation control unit 114 controls the tactile sensation providing unit 150 to provide the vibration in the predetermined vibration pattern based on the instruction. Thereby, the tactile sensation providing unit 150 provides the tactile sensation by the vibration in the predetermined vibration pattern to the contact object contacting the touch face of the touch sensor 140 (step S106). Thereby, the tactile sensation providing apparatus 100 may provide the tactile sensation, through the user interface employing the touch sensor and the GUI, only when detecting the input to the object suggesting a position to contact to the operator.

According to the tactile sensation providing apparatus 100, as described above, there is no problem in performing the above operation when the application supports the operation to provide the tactile sensation. That is, in using the application preliminarily incorporating the operation to provide the tactile sensation therein, the predetermined tactile sensation may be appropriately provided by the above operation.

However, in using an application that does not support the operation to provide the tactile sensation as it stands, the tactile sensation providing apparatus 100 may not appropriately provide the tactile sensation when the display of the object is changed based on the contact operation. Accordingly, in order to utilize various application resources that have been developed to date, each application needs to be modified to include the operation to provide the tactile sensation based on the predetermined condition. Since such modification to add the operation needs to be performed to each of various applications, enormous work and cost are anticipated.

Under such a circumstance, it is concerned that, in the future, vendors may be prevented from developing the applications for the tactile sensation providing apparatus and a spread of platforms employing the touch sensor and the GUI may be delayed.

Moreover, in order to perform the operation described above, the application execution unit 120 needs to be involved in throughout the following operations: monitoring of the contact to the touch sensor 140, determination on whether the contact position corresponds to the object, change of the display of the object, and provision of the tactile sensation. In order to develop or design an application for performing such operations, complicated works an also an increase in the burden on the application execution unit 12 for executing the application are anticipated.

Further, the techniques disclosed in the above Patent Documents 1 and 2, for example, merely vibrate the touch sensor in response to a contact when the touch sensor detects the contact. Therefore, even when the application that supports provision of the tactile sensation is applied to the apparatuses disclosed in the Patent Documents 1 and 2, the apparatuses may not provide the tactile sensation appropriately. Especially in using the apparatus having a button switch such as a mechanical push-button switch (push-type button switch) graphically depicted on the touch sensor, the tactile sensation is provided when the finger or the like lightly contacts (touches) the touch sensor. Since the apparatus responds to such a light contact prior to the pressing (pushing) operation to the touch sensor by the operator, which is different from a response of the depicted image (push button), an erroneous operation may be triggered.

Moreover, since the apparatuses according to the above patent documents, even when the operator does not intend to push (that is, not applying a force on) the image of the button switch, provide the tactile sensation in response to the light touch (contact) to the touch sensor, the operator has a feeling of strangeness. For example, the touch sensor of the resistive film type provides the tactile sensation when an upper conductive film is contacted to a lower conductive film, and the touch sensor of the capacitive type provides the tactile sensation when an electric signal by the contact is detected.

Further, when a conventional tactile sensation providing apparatus employs the user interface based on the application preliminarily incorporating the operation to provide the tactile sensation by the touch sensor therein, an operation feeling of the mechanical push-button switch is not provided when the input is detected. That is, the tactile sensation provided by the conventional tactile sensation providing apparatus merely notifies the operator of that the contact is detected, as the conventional tactile sensation providing apparatus merely vibrates the touch face. Accordingly, the tactile sensation provided by the conventional tactile sensation providing apparatus does not provide the operator with a realistic operation feeling similar to that obtained when operating the mechanical push-button switch.

However, the user interface using the touch sensor and the GUI often displays the image of the object graphically depicting an actual mechanical push-button switch. Therefore, when an input to such an object is detected, it is preferable to provide the realistic tactile sensation similar to that of the mechanical push-button switch, from a point of view of the operation feeling of the operator. Providing feedback obtained when clicking an actual key or button upon detection of the input to the displayed object may improve the operation feeling of the operator.

In operating the mechanical push-button switch, the operator applies a certain pressure force on the switch, by which the switch is pressed down and provides a tactile sensation of depression (hereinafter, referred to as a click sensation) of a metal dome switch, for example. In operating the mechanical push-button switch, also, the operator reduces the pressure force in the course of releasing the switch being pressed down, by which the operator may obtain a tactile sensation (hereinafter, referred to as a release sensation) of the metal dome switch or the like being restored to its original non-pressed state. Further, in using the mechanical push-button switch, the click sensation is not provided when the operator touches (contacts) the switch very lightly and, since the click sensation is not provided, the release sensation is not provided, either. The conventional tactile sensation providing apparatus using the touch sensor and the GUI is not able to provide the click sensation and the release sensation of the mechanical push-button switch described above.

In order to provide the realistic tactile sensations such as the click sensation and the release sensation, it is necessary to add an application having all necessary operations to provide the realistic tactile sensations to the tactile sensation providing apparatus. Further, in order to provide the realistic tactile sensations, it is also necessary to input detection data of the sensor to the application and to follow determinations and instructions of the application. To develop or design the application for performing such operations, complicated works and an increase in the burden on the application execution unit 120 for executing the application are anticipated.

Accordingly, an object of the present invention in consideration of such conditions is to provide a tactile sensation providing apparatus which, without wasting an existing application resource constituting the user interface, provides the tactile sensation based on the operation to the object by the operator, and a control method for the tactile sensation providing apparatus.

Solution to Problem

In order to achieve the above object, a tactile sensation providing apparatus according to a first aspect of the present invention includes:
a touch sensor;
a tactile sensation providing unit configured to vibrate a touch face of the touch sensor;
a display unit; and
a control unit configured to set a tactile sensation to be provided by the tactile sensation providing unit for an object displayed on the display unit based on information about the tactile sensation supplied from application software and, when detecting an input to the object, to control the tactile sensation providing unit such that the tactile sensation set for the object is provided to a pressing object pressing the touch face.

A second aspect of the present invention is the tactile sensation providing apparatus according to the first aspect, wherein
the control unit, based on an instruction associated with provision of the tactile sensation output together with information associated with a display by the application software, sets the tactile sensation to be provided by the tactile sensation providing unit for the object.

A third aspect of the present invention is the tactile sensation providing apparatus according to the first or second aspect, further including a load detection unit configured to detect a pressure load on the touch face of the touch sensor, wherein,
when the load detection unit detects the pressure load satisfying a standard load for providing the tactile sensation while the control unit is detecting the input to the object, the control unit controls the tactile sensation providing unit such that the tactile sensation is provided to the pressing object.

In order to achieve the above object, a control method for a tactile sensation providing apparatus according to a fourth aspect of the present invention including
a touch sensor, a tactile sensation providing unit configured to vibrate a touch face of the touch sensor, and
a display unit; including a step of:
setting a tactile sensation to be provided by the tactile sensation providing unit for an object displayed on the display unit based on information about the tactile sensation supplied from application software and, when detecting an input to the object, controlling the tactile sensation providing unit such that the tactile sensation set for the object is provided to a pressing object pressing the touch face.

Effect of the Invention

According to the present invention, an existing application may be utilized and a user interface having excellent operability may be provided by using the existing application.

DESCRIPTION OF EMBODIMENT

An embodiment of the present invention will be described with reference to the accompanying drawings.

According to the present invention, based on information for generating a user interface to be displayed on the display unit and information about a tactile sensation supplied by application software, the tactile sensation is set for an object. According to the present invention, also, the tactile sensation is provided not in response to a light contact (touch) to a touch sensor but in response to a pressing (pushing) operation intended by an operator.

Figure 1:
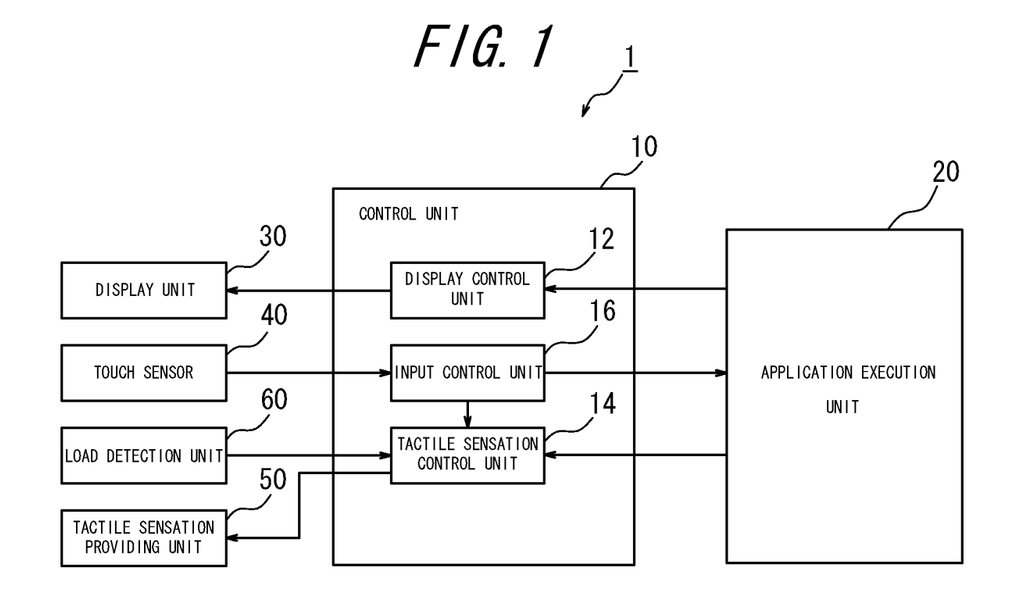
FIG. 1 is a block diagram illustrating a schematic configuration of a tactile sensation providing apparatus according to an embodiment of the present invention.

FIG. 1 is a block diagram illustrating a schematic configuration of a tactile sensation providing apparatus according to the embodiment of the present invention.

As illustrated in FIG. 1, a tactile sensation providing apparatus 1 includes a control unit 10, an application execution unit 20, a display unit 30, a touch sensor 40, a tactile sensation providing unit 50 and a load detection unit 60. The control unit 10 includes a display control unit 12, a tactile sensation control unit 14 and an input control unit 16.

The control unit 10 controls the entire tactile sensation providing apparatus 1 including each function unit. The application execution unit 20 retrieves a variety of applications from a memory unit (not illustrated) and executes operations based on the applications. According to the present embodiment, the application execution unit 20 executes an application that does not originally support provision of the tactile sensation but is modified such that tactile sensation is set for each object. An operation to modify the application to support provision of the tactile sensation will be described below.

The display unit 30 displays an object graphically depicting a push-button switch (push-type button switch). The push-button switch is a mechanical key like an input button or a key (hereinafter, referred to simply as "keys or the like") that may be actually pressed down. According to the present embodiment, the display unit 30 displays the object graphically depicting the push-button switch. The display unit 30 may be constituted by using, for example, a liquid crystal display panel, an organic EL display panel and the like. The application execution unit 20, in generating the user interface and in changing an image of the object and the like, supplies information (display data) about the image constituting the user interface to the display control unit 12. When receiving the information about the user interface, the display control unit 12 may control the display unit 30 to display based on the information. It is to be noted that, in the figures and the following description, the "user interface" is appropriately abbreviated to "UI".

The touch sensor 40 is usually disposed on a front face of the display unit 30 to detect a pressing operation (contact) to the object displayed on the display unit 30 by an operator's finger or the like (pressing object) at a corresponding position on the touch face of the touch sensor 40. Upon detection of the contact to the touch face, the touch sensor 40 notifies the application execution unit 20 of a detected contact position via the input control unit 16. The touch sensor 40 may include a known type such as a resistive film type, a capacitive type and an optical type.

The tactile sensation providing unit 50 is constituted by using a piezoelectric vibrator or the like and vibrates the touch face of the touch sensor 40. By vibrating the touch face of the touch sensor 40, the tactile sensation providing unit 50 provides the tactile sensation to the pressing object pressing the touch face. The pressing object pressing the touch face is, for example, the operator's finger or a stylus pen. The load detection unit 60 detects a pressure load on the touch face of the touch sensor 40 and may include an element such as, for example, a strain gauge sensor, a piezoelectric element or the like, which linearly reacts to a load. Also, the load detection unit 60 notifies the tactile sensation control unit 14 of the detected pressure load on the touch face of the touch sensor 40.

The display control unit 12 of the control unit 10, based on the display data supplied from the application execution unit 20, controls the display to display the image of the object on the display unit 30 or to change the image. The display control unit 12 receives the display data of the object used for generating the UI to be displayed on the display unit 30 from the application execution unit 20. Also, the display control unit 12, when the contact position on the touch sensor 40 by the operator corresponds to an object for executing a predetermined operation, receives display data of the object indicating reception of the input from the application execution unit 20.

The input control unit 16 notifies one or both of the application execution unit 20 and the tactile sensation control unit 14 of the contact position of the operator on the touch sensor 40.

The tactile sensation control unit 14 according to the present embodiment includes a memory unit (not illustrated) and, at least temporarily, stores the information about the tactile sensation set for each object based on an instruction of the application executed by the application execution unit 20. According to the present embodiment, that is, the tactile sensation control unit 14 may set the tactile sensation for the object, as described below. Accordingly, when the tactile sensation is set for the object by the tactile sensation providing unit 14, the input control unit 16 notifies the tactile sensation control unit 14 of the contact position on the touch sensor 40 and thus the tactile sensation control unit 14 may control provision of the tactile sensation. In this case, that is, the application execution unit 20 does not need to instruct an operation associated with provision of the tactile sensation for receiving notification of the contact position on the touch sensor 40 and determining whether the contact position corresponds to the object.

When being notified of the contact position on the touch sensor 40 from the input control unit 16, the tactile sensation control unit 14 determines whether the contact position corresponds to the object having the tactile sensation set therefor. When the contact position corresponds to the object having the tactile sensation set therefor, the tactile sensation control unit 14 controls the tactile sensation providing unit 50 to provide the tactile sensation set for the object. According to the present embodiment, the tactile sensation is provided when a predetermined pressure load is detected by the load detection unit 60. That is, when the pressure load detected by the load detection unit 60 satisfies a standard load for providing the tactile sensation while the touch sensor 40 is detecting the contact at a position corresponding to the object for executing the predetermined operation, the tactile sensation control unit 14 controls the tactile sensation providing unit 50 to provide the tactile sensation set for the object. By generating vibration in a predetermined pattern, the tactile sensation providing unit 50 provides the pressing object such as the operator's finger or the like pressing the touch face of the touch sensor 40 with a tactile sensation set therefor.

Figure 2:
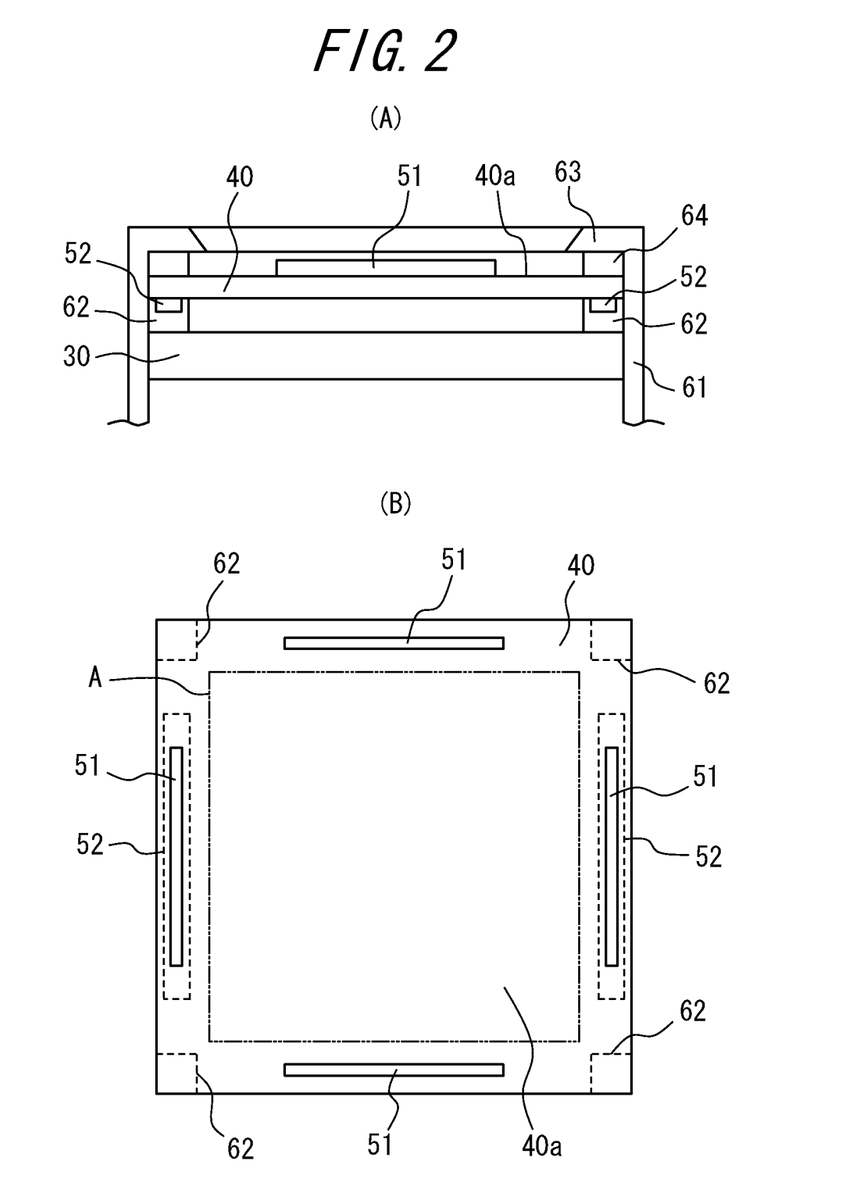
FIG. 2 is a diagram illustrating an exemplary implementation structure of the tactile sensation providing apparatus illustrated in FIG. 1.

FIG. 2 illustrates an exemplary implementation structure of the tactile sensation providing apparatus 1 illustrated in FIG. 1; FIG. 2(A) is a cross-sectional view of a main section, and FIG. 2(B) is a plane view of the main section. The display unit 30 is contained in a housing 61. The touch sensor 40 is disposed on the display unit 30 via insulators 62 made of elastic members. In the tactile sensation providing apparatus 1 according to the present embodiment, the display unit 30 and the touch sensor 40 are rectangular in shape in a planar view. Also, in the tactile sensation providing apparatus 1, the touch sensor 40 is held on the display unit 30 via the insulators 62 arranged at four corners outside a display area A of the display unit 30 indicated by a chain double-dashed line in FIG. 2(B).

In addition, the housing 61 is provided with an upper cover 63 covering a surface area of the touch sensor 40 outside the display area of the display unit 30. An insulator 64 made of elastic member is arranged between the upper cover 63 and the touch sensor 40. The touch sensor 40 illustrated in FIG. 2 may have, for example, a surface member having a touch face 40a and constituted of a transparent film or the glass, and a rear face member made of the glass or acryl. The touch sensor 40 is designed such that, when the touch face 40a is pressed down, a pushed part is slightly bent (strained) relative to a pressing force or a structure itself is bent slightly.

A strain gauge sensor 51 to detect a load (the pressuring force) applied on the touch sensor 40 is provided, adhered or the like, on a surface of the touch sensor 40 at a position close to each side to be covered by the upper cover 63. Also, a piezoelectric vibrator 52 to vibrate the touch sensor 40 is provided, adhered or the like, on the rear face of the touch sensor 40 at a position close to an edge of each of two opposing sides. That is, the tactile sensation providing apparatus 1 illustrated in FIG. 2 has the load detection unit 60 illustrated in FIG. 1 including four strain gauge sensors 51 and the tactile sensation providing unit 50 including two piezoelectric vibrators 52. In addition, the tactile sensation providing unit 50 vibrates the touch sensor 40 such that the touch face 40a is vibrated. It is to be noted that the housing 61, the upper cover 63 and the insulator 64 illustrated in FIG. 2(A) are omitted in FIG. 2(B).

The following is a description of the operation according to the present embodiment to set the tactile sensation corresponding to the object for the tactile sensation control unit 14 based on the instruction by the application modified to support provision of the tactile sensation.

According to the present embodiment, as described above, the application is preliminarily modified to include a relationship between the object and the information associated with the tactile sensation to be provided based on the input to the object. However, if an application that does not originally support provision of the tactile sensation is modified to include all processing (determinations and instructions) associated with the operation to provide the tactile sensation, addition of various control information is generally required and thus work and cost may be greatly increased.

According to the present embodiment, therefore, the information associated with the tactile sensation is added to information associated with a display of the UI originally included in the application. Thereby, when the UI is displayed on the display unit 30 for the first time, or when the UI being displayed is changed, the information associated with the tactile sensation is supplied together with the information associated with the display of the UI. Accordingly, since the information associated with the tactile sensation is supplied from the application, the tactile sensation control unit 14, when the UI is displayed for the first time or when the UI being displayed is changed, may set the tactile sensation for each object constituting the UI. That is, the tactile sensation control unit 14, at this time, based on the information associated with the tactile sensation supplied from the application executed by the application execution unit 20 outside the control unit 10, sets the tactile sensation to be provided by the tactile sensation providing unit 50 for the object displayed on the display unit 30.

In detail, for example, the application using the UI constituted by using the object usually includes a definition of position information of the object (i.e., information about a position where the object is displayed in an area of the display unit 30 for displaying the UI). Generally, the application also includes a definition of a size of the object (i.e., an area for detecting the contact to the touch sensor 40 corresponding to the position of the object). Therefore, the application is modified by adding the information about a type of the tactile sensation to be provided when the input to the object is detected and information about the standard load for providing the tactile sensation, in association with the information about the position and the size of the object constituting the UI used by the application.

According to the present embodiment, by simply adding at least these information to the application, different tactile sensations set for each object constituting the UI are provided based on various conditions. Therefore, other operations solely for the purpose of providing the tactile sensation, such as monitoring the contact to the touch sensor 40 and determination on whether the contact position corresponds to the object, do not need to be added to the application.

Figure 3:
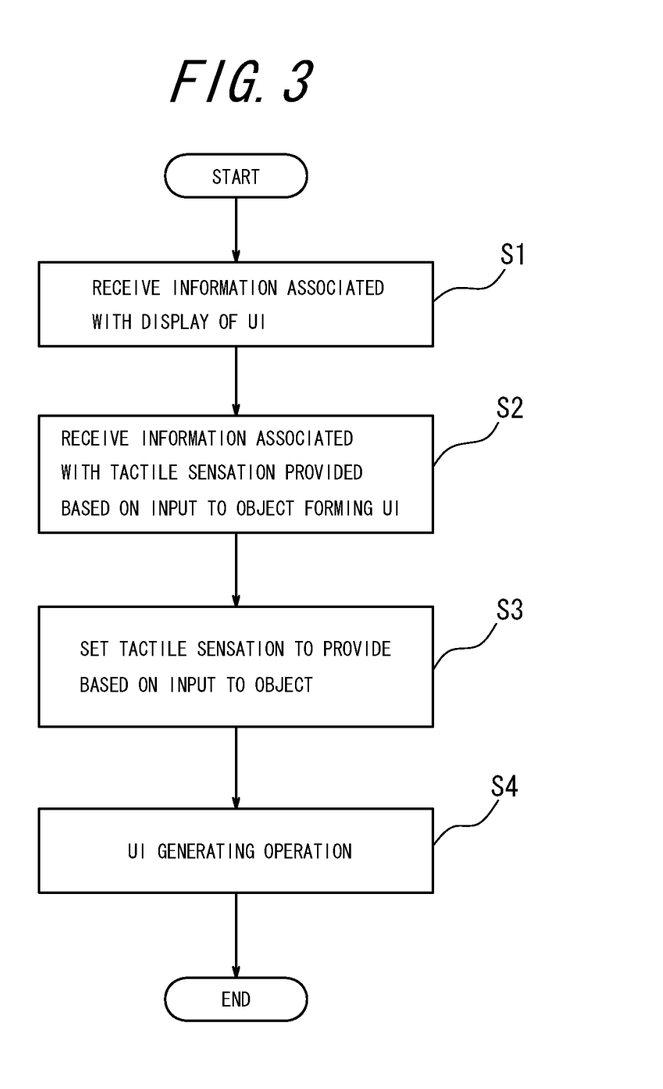
FIG. 3 is a diagram illustrating a user interface generating operation according to the embodiment.

FIG. 3 is a flowchart illustrating a UI generating operation according to the present embodiment. This is an operation to be executed when a new UI provided by the application is generated with an instruction of the application executed by the application execution unit 20, or when the UI provided by the application is changed to a new UI. According to the present embodiment, that is, when a new UI provided by the application is generated, it is necessary to set the tactile sensation for the object constituting the UI. Also, when the UI being displayed is changed with the instruction of the application, the position of the object to be displayed may be changed. Therefore, in this case also, it is necessary to set the tactile sensation for the object constituting the UI after change.

The UI generating operation illustrated in FIG. 3 starts upon instruction of the application when, for example, a new UI provided by the application is generated or when the UI provided by the application is changed to a new UI. The flowchart in FIG. 3 illustrates the operation from a point of view of the control unit 10. When this operation starts, the information (display data) associated with the display of the UI for generating the UI provided by the application is output to the display control unit 12 from the application being executed by the application execution unit 20. The display control unit 12 of the control unit 10 receives the information associated with the display of the UI (step S1).

As described above, the information associated with the tactile sensation is added to the information associated with the display of the UI in the application used in the present embodiment. Accordingly, when the information associated with the display of the UI is output to the display control unit 12 from the application, the information associated with the tactile sensation to be provided based on the input to the object constituting the UI is also output. Therefore, the tactile sensation control unit 14 of the control unit 10 receives the information associated with the tactile sensation to be provided based on the input to the object (step S2).

Upon receiving the information associated with the tactile sensation to be provided based on the input to the object, the tactile sensation control unit 14 sets the tactile sensation to be provided by the tactile sensation providing unit 50 for each object constituting the UI (step S3). At this time, a variety of tactile sensations may be set according to the information associated with the tactile sensation added to the application. For example, the contact position and a contact area of the touch sensor 40 are designated and, based on the object displayed at the contact position or in the contact area, the type of the tactile sensation (for example, a sensation of a metal dome switch or a rubber switch) and a manner of the tactile sensation (for example, intensity of feedback) are set. Also, based on the information associated with the tactile sensation added to the application, for example, the standard load for providing the tactile sensation is set for each object. The standard load is a predetermined standard load for providing the tactile sensation to the pressing object pressing the touch face of the touch sensor 40 when the load detection unit 60 detects the pressure load satisfying the predetermined standard load.

In detail, for example, a relatively weak sensation (feedback) may be set for a small object. In this case, for example, a frequency of a generated vibration is set to be high and duration of the vibration is set to be short. On the other hand, a relatively strong sensation (feedback) may be set for a large object. In this case, for example, the frequency of the generated vibration is set to be low and the duration of the vibration is set to be long. Also, for the small object, the standard load for providing the tactile sensation is set to be relatively small, for example, such that the tactile sensation is provided in response to a relatively light pressure of the operator. For the large object, the standard load for providing the tactile sensation is set to be relatively large such that a relatively strong pressure of the operator is needed to provide the tactile sensation. The tactile sensation control unit 14 stores the information about the tactile sensation set for each object in the memory unit (not illustrated).

When setting of the tactile sensation is completed at step S3, the control unit 10 performs the UI generating operation (step S4). In detail, the UI generating operation is an operation to display a graphical image of the UI on the display unit 30 based on the information associated with the display of the UI received by the display control unit 12 and to associate the UI with the application to be activated when the input to the object is detected.

By the UI generating operation according to the present embodiment described above, the UI is displayed on the display unit 30 and preparation for providing the tactile sensation upon detection of the input to the object constituting the UI is completed.

Next, an operation of the tactile sensation providing apparatus 1, after the UI is displayed on the display unit 30, to provide the tactile sensation based on the pressing operation by the operator will be described.

The tactile sensation providing apparatus 1 according to the present embodiment provides the tactile sensation when the pressure load detected by the load detection unit 60 satisfies the predetermined standard load while an operator's contact to the image of the object displayed on the display unit 30 is being detected by the touch sensor 40. In this case, when the pressure load detected by the load detection unit 60 satisfies the predetermined standard load, the tactile sensation is provided based on determination that the operator does not contacted the touch sensor inadvertently (by an erroneous operation or the like) but presses (pushes) intentionally.

Figure 4:
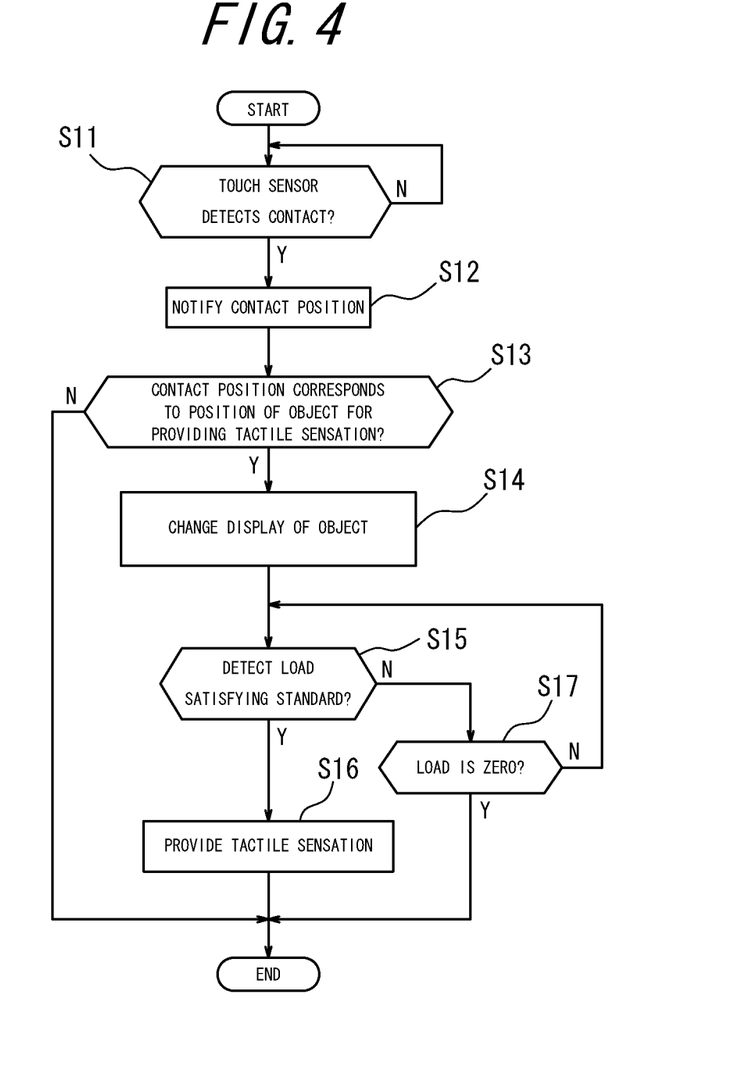
FIG. 4 is a flowchart illustrating a click sensation providing operation of the tactile sensation providing apparatus illustrated in FIG. 1.

FIG. 4 is a flowchart illustrating the operation of the tactile sensation providing apparatus 1 according to the present embodiment. When the tactile sensation providing apparatus 1 performs the operation, it is assumed that, by the UI generating operation described above, the display unit 30 preliminarily displays the image of the object such as the key or the like to allow detection of the pressing operation by the operator's finger or the stylus pen. That is, it is assumed in the following description that the UI supplied by the modified application and constituted by using the object having the tactile sensation set therefor is displayed. This application according to the present embodiment, in order to notify the operator of detection of the contact when the contact to the touch sensor 40 at a position corresponding to the image of the object displayed on the display unit 30 is detected, changes the display of the image of the object in some manner. According to the present embodiment, however, such a change of the image is not essential.

When the preparation stated above is completed, the tactile sensation providing apparatus 1 according to the present embodiment starts the operation. When the tactile sensation providing apparatus 1 starts the operation, first, the input control unit 16 monitors a contact to the touch face of the touch sensor 40 by the operator's finger or the like (step S11). When the contact to the touch face of the touch sensor 40 is detected at step S11, the input control unit 16 notifies the application execution unit 20 and the tactile sensation control unit 14 of a contact position (step S12).

When being notified of the contact position on the touch sensor 40, the application execution unit 20 determines whether the contact position corresponds to the image of the object such as the key or the like in GUI currently in use (step S13). When the contact position corresponds to the image of the object, the application execution unit 20 supplies the display control unit 12 with the display data for changing the image of the object in accordance with the setting based on the application. Upon receiving the display data, the display control unit 12 controls the display unit 30 to change the image of the object being displayed (step S14). That is, when the contact to the object such as the key or the like is detected, the tactile sensation providing apparatus 1 changes the image of the object being displayed. In changing the image of the object being displayed, it is preferable to indicate that the object is selected or to change color or brightness of the object, such that the contact (touch) to the key or the like is visually confirmed by the operator. Such a change in the display of the image of the object may be performed in a variety of manners in accordance with the setting based on the application.

At step S13, the input control unit 16 also may determine whether the contact position corresponds to the image of the object. Therefore, when the input to the object is detected (that is, when there is a contact to the object such as the key or the like) at step S13, the operation associated with provision of the tactile sensation at step S15 and operations thereafter may be performed without involving the application execution unit 20. At step S15, the tactile sensation control unit 14 determines whether the pressure load detected by the load detection unit 60 is increased by a pressure on the touch face of the touch sensor 40 and satisfies the predetermined standard. The load detection unit 60 detects the load from, for example, an average output value of the four strain gauge sensors 51. Here, it is preferable that, based on the pressure load of a usual pressing operation by the operator, the predetermined standard load is preset to be, for example, 1.5 N (Newton) and resettable thereafter. In consideration of the pressure load in pressing operation intended by the operator (for example, an average value or the like), the predetermined standard is set avoiding an extremely small value. This is for preventing from regarding inadvertent light contact to the touch face by the operator as the pressing (pushing) operation and for providing a realistic tactile sensation described below to the operator.

When the pressure load satisfies the predetermined standard load at step S15, the tactile sensation control unit 14 controls the tactile sensation providing unit 50 to generate predetermined vibration on the touch face of the touch sensor 40 such that the tactile sensation is provided (step S16). That is, when the pressure load satisfying the standard load for providing the tactile sensation is detected by the load detection unit 60 while the input to the object for executing the predetermined operation is being detected, the tactile sensation control unit 14 controls the tactile sensation providing unit 50 to provide the tactile sensation. Thereby, the tactile sensation providing unit 50 provides the tactile sensation to the pressing object pressing the touch face of the touch sensor 40. The tactile sensation provided at this time, as described with reference to FIG. 3, is set based on the information received from the application.

According to the present embodiment, the tactile sensation provided to the pressing object by the tactile sensation providing unit 50 at step S16 may be a click sensation provided when clicking an actual key or button. In order to provide a realistic click sensation to the operator, the tactile sensation providing apparatus 1 stimulates a tactile sensation of the operator while stimulating a pressure sensation. That is, the tactile sensation providing apparatus 1 stimulates the pressure sensation until the pressure load applied to the touch sensor 40 satisfies the standard to provide the tactile sensation (for example, 15 N) and, when the pressure load satisfies the standard, stimulates the tactile sensation by driving the piezoelectric element 52 with a predetermined drive signal such that the touch face 40a is vibrated. Thereby, the tactile sensation providing apparatus 1 may provide the operator with the click sensation similar to that obtained when pressing down a button switch such as the push-button switch (push-type button switch). Accordingly, even when the push-button switch is graphically depicted on the touch sensor, the operator may carry out the pressing operation to the touch sensor 40 feeling the realistic click sensation similar to that obtained when operating the actual push-button switch. Therefore, the operator would not have a feeling of strangeness. Moreover, since the operator may carry out the pressing operation in conjunction with perception to "have pressed" the touch sensor 40, erroneous inputs caused by mere tapping may be prevented.

The drive signal to provide the click sensation described above, that is, a certain frequency, a cycle (wavelength), a waveform and vibration amplitude to stimulate the tactile sensation may be set appropriately according to the click sensation to be provided. For example, in order to provide the click sensation represented by a metal dome switch employed by a mobile terminal, the tactile sensation providing unit 50 is driven by the drive signal, for example, a sine wave with a frequency of 170 Hz, for one cycle. The tactile sensation providing unit 50 is driven with the drive signal described above such that the touch face 40a is vibrated by approximately 15 μm under the pressure load satisfying the predetermined standard load. Thereby, the realistic click sensation similar to that obtained when pressing down the actual key may be provided to the operator.

On the other hand, when the pressure load does not satisfy the predetermined standard load at step S15, the tactile sensation control unit 14 determines whether the pressure load detected by the load detection unit 60 becomes zero as the pressure on the touch face of the touch sensor 40 decreases (step S17). When the pressure load detected by the load detection unit 60 is not zero at step S17, it means that the operator has not canceled (released) the operation to the touch sensor 40. Therefore, the tactile sensation control unit 14 returns to step S15 to continue the operation. When the pressure load detected by the load detection unit 60 is zero at step S17, it is determined that the operator has canceled (released) the operation to the touch sensor 40. Therefore, the tactile sensation control unit 14 ends the operation illustrated in FIG. 4. At step S17, instead of an operation for determining whether the pressure load detected by the load detection unit 60 becomes zero, an operation for determining whether the contact to the touch sensor 40 is still detected may be performed.

At step S13, when the contact position does not correspond to the image of the object, the application execution unit 20 ends the operation illustrated in FIG. 4. That is, when the input to the object such as the key or the like is not detected, or when the input is performed to elsewhere than the object such as the key or the like, the application execution unit 20 ends the operation illustrated in FIG. 4 without changing the display of the object. In this case, further, the input control unit 16 ends the operation without instructing the tactile sensation control unit 14 to provide the tactile sensation. Accordingly, when the contact to elsewhere than the object such as the key or the like is detected, the tactile sensation providing apparatus 1 does not provide the tactile sensation, thereby the operator may recognize that an input to the object is not detected.

According to the present embodiment, as described above, when the input to the object for executing the predetermined operation is detected and, simultaneously, the pressure load satisfying the predetermined standard load is detected, the tactile sensation supplied by the application and set for the object is provided. According to the present embodiment, also, the tactile sensation may be set for each object appropriately by adding the information about the tactile sensation to the application, and the operation to prove the tactile sensation may be performed without involving the application execution unit 20. According to the tactile sensation providing apparatus 1 of the present embodiment, therefore, when the input is detected, the tactile sensation corresponding to the object may be provided, and the existing application constituting the UI may be utilized as the information associated with the tactile sensation is added thereto. According to the tactile sensation providing apparatus 1 of the present embodiment, further, in response to the pressing (pushing) operation to the object such as the key or the like, the realistic click sensation is provided to the operator. Thereby, the operator may confirm that the input to the object is appropriately recognized.

The following is a description of an operation to provide a release sensation after providing the click sensation when the pressure load satisfying the standard load is detected while the tactile sensation providing apparatus 1 is detecting the contact by the operator.

In the pressing operation to the mechanical push-button switch, when the pressure to the switch decreases, a tactile sensation (hereinafter, referred to as the release sensation) of the metal dome switch restoring to its original state is provided. Since the tactile sensation providing apparatus 1 according to the present embodiment may provide the realistic click sensation in response to the pressing operation, it is preferable that the tactile sensation providing apparatus 1 may provide a realistic release sensation when the pressure on the touch sensor is canceled (released), such that a sequence of natural operation feelings is provided.

Figure 5:
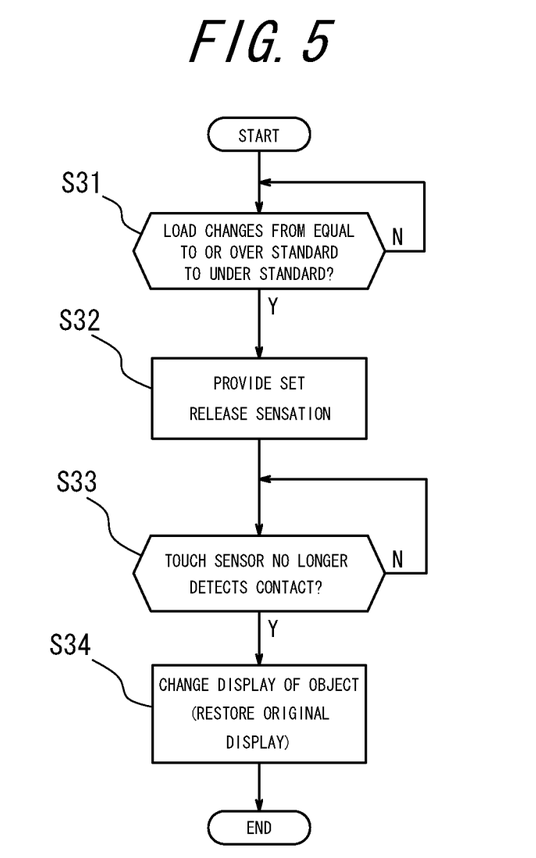
FIG. 5 is a flowchart illustrating a release sensation providing operation of the tactile sensation providing apparatus illustrated in FIG. 1.

FIG. 5 is a flowchart illustrating the operation of the tactile sensation providing apparatus 1 according to the present embodiment. The operation illustrated in FIG. 5 starts after the operation to provide the click sensation (step S16) described with reference to FIG. 4. When this operation starts, the tactile sensation control unit 14 determines whether the pressure load of the operation to the touch sensor 40 by the operator decreases and the pressure load detected by the load detection unit 60 has changed from equal to or over the predetermined standard load (step S31). Here, "change from equal to or over the predetermined standard load to under the predetermined standard load" is a change of the pressure load, when the pressure is released, from a state exceeding (or equal to) the predetermined standard load to a state falling under (or below) the predetermined standard load.

When it is determined at step S31 that the pressure load has changed from equal to or over the predetermined standard load to under the predetermined standard load, the tactile sensation control unit 14 controls the tactile sensation providing unit 50 to provide the release sensation set by the application (step S32).

Here, although the standard load for providing the release sensation may be set to be equal to the standard for providing the click sensation set forth above, it is preferable to set the standard load for providing the release sensation to be as low as 50-80% of that for providing the click sensation in pressing. Thereby, timings to provide the tactile sensations are synchronized with timings of sequential pressing and releasing when the same position (object) is repetitively pressed (that is, when the same key is continuously pressed), providing the realistic click sensation without the feeling of strangeness. That is, setting the standard load for providing the tactile sensation in releasing to be smaller than that in pressing enables to provide the tactile sensation without the feeling of strangeness. In this case, setting the standard load for providing the tactile sensation in releasing to be approximately 50% or more of that in pressing contributes to a significant improvement in operability in the continuous pressing operations. Moreover, setting the standard load for providing the tactile sensation in releasing to be approximately 80% or less of that in pressing enables to deal with a faint load change in a holding state in the continuous pressing operations. These settings of the standard load are preliminarily added to the application as the information associated with the tactile sensation.

When the release sensation is provided at step S32, the input control unit 16 determines whether the touch sensor 40 no longer detects the contact (step S33). When the touch sensor 40 no longer detects the contact, the input control unit 16 notifies the application execution unit 20 of cancel of the contact. Then, the application execution unit 20 supplies the display control unit 12 with the display data for changing the image of the object in accordance with setting based on the application. Upon receiving the display data, the display control unit 12 controls the display unit 30 to change the image of the object being displayed (step S34). That is, the display control unit 12, when the contact is released from the object such as the key or the like, changes the image of the object being displayed. In changing the image of the object being displayed, the display of the selected object is restored to an unselected state or color or brightness of the object may be changed, for example. It is preferable to allow the operator, by changing the display as described above, to visually confirm that the contact to the key or the like is released.

Thereby, a more realistic click sensation such as a click sensation "Cli" in pressing and a click sensation "Ck" in releasing may be provided. The same drive signal as that of the click sensation may certainly be used for the release sensation. According to the present embodiment, however, the release sensation different from the click sensation may be set.

According to the tactile sensation providing apparatus 1 of the present embodiment, as described above, the tactile sensation to be provided based on an input to each object may be set for each object based on the application to which the information associated with the tactile sensation is added. Therefore, the tactile sensation providing apparatus 1, by slightly modifying the existing application, may appropriately provide the tactile sensation for each object. Also, the tactile sensation providing apparatus 1 according to the present embodiment may provide a variety of tactile sensations including the click sensation and the release sensation based on the input to the object. Therefore, the tactile sensation providing apparatus 1 may utilize the existing application and also provide a realistic operation feeling similar to that obtained when operating the actual push-button switch.

Figure 6:
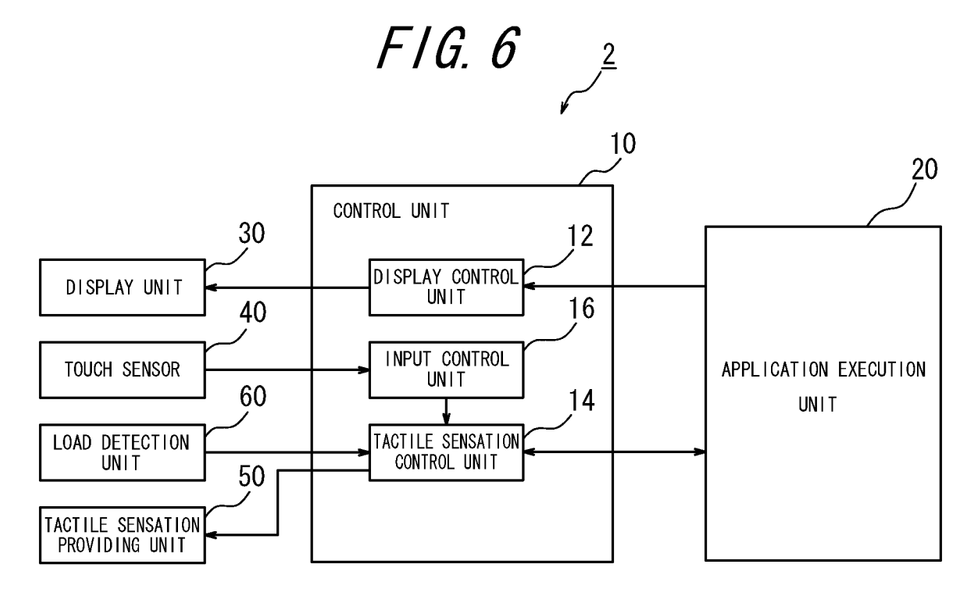
FIG. 6 is a block diagram illustrating another example of the schematic configuration of the tactile sensation providing apparatus according to the embodiment of the present invention.

It is to be understood that the present invention is not limited to the above embodiment but may be modified or varied in a multiple of manners. For example, hardware of the tactile sensation providing apparatus according to the present invention is not limited to the configuration illustrated in the block diagram of FIG. 1 but may be varied or changed in a variety of manners. That is, it is also possible to configure such that the contact position on the touch sensor 40 is always notified via the tactile sensation control unit 14 instead of following a path from the input control unit 16 to the application execution unit 20 as illustrated in FIG. 6, for example. Thereby, the number of necessary interfaces is reduced by limiting to only one unit to notify of the contact position on the touch sensor 40, which enables easy designing of the hardware.

Also, according to the above embodiment, the control unit 10 includes the display control unit 12, the tactile sensation control unit 14 and the input control unit 16. However, the tactile sensation providing apparatus according to the present invention is not limited to such a configuration but may be configured in a variety of manners according to designing requirements. For example, one function unit may serve for the other function as well such that the other function unit may be omitted, or the one function unit may be separated into a plurality of function units.

The load detection unit according to the embodiment set forth above may be configured in accordance with a contact detection method employed by the touch sensor. For example, the load detection unit may be constituted without using the strain gauge sensor if the load may be detected from a change in an output signal based on a change in resistance in accordance with a contact area in using the capacitive type. Alternatively, the load detection unit may be constituted without using the strain gauge sensor if the load may be detected from a change in an output signal based on a change in capacitance in using the capacitive type.

The tactile sensation providing unit may be constituted by using any number of piezoelectric vibrators, transparent piezoelectric elements provided on an entire surface of the touch sensor or, if it is possible to vibrate such that the tactile sensation is provided, an eccentric motor which rotates 360 degrees in one cycle of the drive signal. Moreover, the load detection unit and the tactile sensation providing unit may share piezoelectric elements if both units are constituted by using the piezoelectric elements.

According to the present embodiment set forth above, the touch sensor is placed on the display unit in an overlapping manner. However, the tactile sensation providing apparatus according to the present invention is not limited to such a configuration but the touch sensor and the display unit may be disposed spatially separated from each other.

The present invention may be effectively applied to an input apparatus in which the touch sensor serves as a touch switch for ON/OFF operations.

Moreover, the tactile sensation providing apparatus according to the present invention drives the piezoelectric element when the pressure load detected based on an output of the piezoelectric element satisfies the standard load for providing the tactile sensation. Here, "when the pressure load detected based on the output of the piezoelectric element satisfies the standard load for providing the tactile sensation" may represent either "when the detected pressure load reaches a standard value for providing the tactile sensation", "when the detected pressure load exceeds the standard value for providing the tactile sensation", or "when the standard value for providing the tactile sensation is detected based on the output of the piezoelectric element".

Further, the "display unit" and the "touch sensor" according to the embodiment set forth above may be constituted by an integrated device, such as a common substrate having functions of them and the like. Such an integrated device having both functions of the display unit and the touch sensor may have a configuration in which, for example, a plurality of photoelectric conversion elements such as photodiodes are orderly mixed in a group of pixel electrodes arranged in a matrix pattern in the liquid crystal panel. This integrated device may display an image in a structure of the liquid crystal panel and also detect a touch position by nearby photoelectric conversion elements that receive backlight of the liquid crystal display reflected by a tip of a pen in contact with a desired position on the face of the panel.

REFERENCE SIGNS LIST 1 tactile sensation providing apparatus
10 control unit
12 display control unit
14 tactile sensation control unit
16 input control unit
20 application execution unit
30 display unit
40 touch sensor
40a touch face
50 tactile sensation providing unit
52 piezoelectric vibrator
60 load detection unit
61 housing
62 insulator
63 upper cover
64 insulator

The invention claimed is:

1. A tactile sensation providing apparatus comprising:
a touch sensor;
a tactile sensation providing unit configured to vibrate a touch face of the touch sensor;
a display unit configured to display a user interface having an object; and
a controller configured to, upon an instruction output from an application software, when a new user interface provided by the application software is generated or when the user interface provided by the application software is changed to a new user interface, set a tactile sensation to be provided by the tactile sensation providing unit for an object of the new user interface displayed on the display unit on the basis of information about the tactile sensation and a predetermined standard load added to information associated with a display of the user interface included in the application software, which does not originally support provision of the tactile sensation, and, when detecting a direct input satisfying the predetermined standard load applied to the object via the touch face, to control the tactile sensation providing unit such that the tactile sensation set for the object is provided to a pressing object pressing the touch face.

2. A method for providing a tactile sensation of a tactile sensation providing apparatus, including a touch sensor, a tactile sensation providing unit configured to vibrate a touch face of the touch sensor, and a display unit configured to display a user interface having an object;

the method comprising a step of:

upon an instruction output from an application software, when a new user interface provided by an application software is generated or when the user interface provided by the application software is changed to a new user interface, setting a tactile sensation to be provided by the tactile sensation providing unit for an object of the new user interface displayed on the display unit on the basis of information about the tactile sensation and a predetermined standard load added to information associated with a display of the user interface included in the application software, which does not originally support provision of the tactile sensation, and, when detecting a direct input satisfying the predetermined standard load applied to the object via the touch face, controlling the tactile sensation providing unit such that the tactile sensation set for the object is provided to a pressing object pressing the touch face.

* * * * *